United States Patent [19]

Rasovich

[11] Patent Number: 5,611,213
[45] Date of Patent: Mar. 18, 1997

[54] CRYOGENIC FREEZING SYSTEM FOR RUBBER CRUMBS AND OTHER MATERIALS

[75] Inventor: Ivan Rasovich, Sun Valley, Calif.

[73] Assignee: Koach Engineering & Mfg. Inc., Sun Valley, Calif.

[21] Appl. No.: 552,626

[22] Filed: Nov. 3, 1995

[51] Int. Cl.$^6$ .................................................... F25D 17/02
[52] U.S. Cl. ................................ 62/374; 62/303; 62/380
[58] Field of Search ................................ 62/63, 374, 303, 62/380

[56] References Cited

U.S. PATENT DOCUMENTS

| | | | |
|---|---|---|---|
| 3,101,757 | 8/1963 | Hanson | 62/374 |
| 3,255,608 | 6/1966 | Macintosh | 62/374 |
| 3,376,710 | 4/1968 | Hirtensteiner | 62/374 |
| 3,485,055 | 12/1969 | Webster et al. | 62/63 |
| 3,793,937 | 2/1974 | Lipoma | 62/374 |
| 4,403,479 | 9/1983 | Rasovich | 62/63 |
| 4,858,445 | 8/1989 | Rasovich | 62/374 |

Primary Examiner—Ronald C. Capossela
Attorney, Agent, or Firm—Pretty, Schroeder, Brueggemann & Clark

[57] ABSTRACT

A cryogenic freezing system having a cooling tunnel with an inlet end, an outlet end and a floor therebetween, a tank for a liquid cryogenic material and with an inlet end, an outlet end, and a floor therebetween, a first conveyor for moving crumb material along the tunnel floor for depositing crumb material into the tank, and a second conveyor for moving crumb material along the tank. The tank floor includes a ramp, with the second conveyor positioned to move the crumb material along the floor of the tank upward along the ramp out of the liquid cryogenic material prior to reaching the tank outlet end. The conveyors are endless belts of open material, with openings of a size to pass the crumb material so that the crumb material will fall through the conveyor onto the floors. Scraper blades are carried on the belts projecting outward from the conveyors to move along and in contact with the floors.

13 Claims, 2 Drawing Sheets

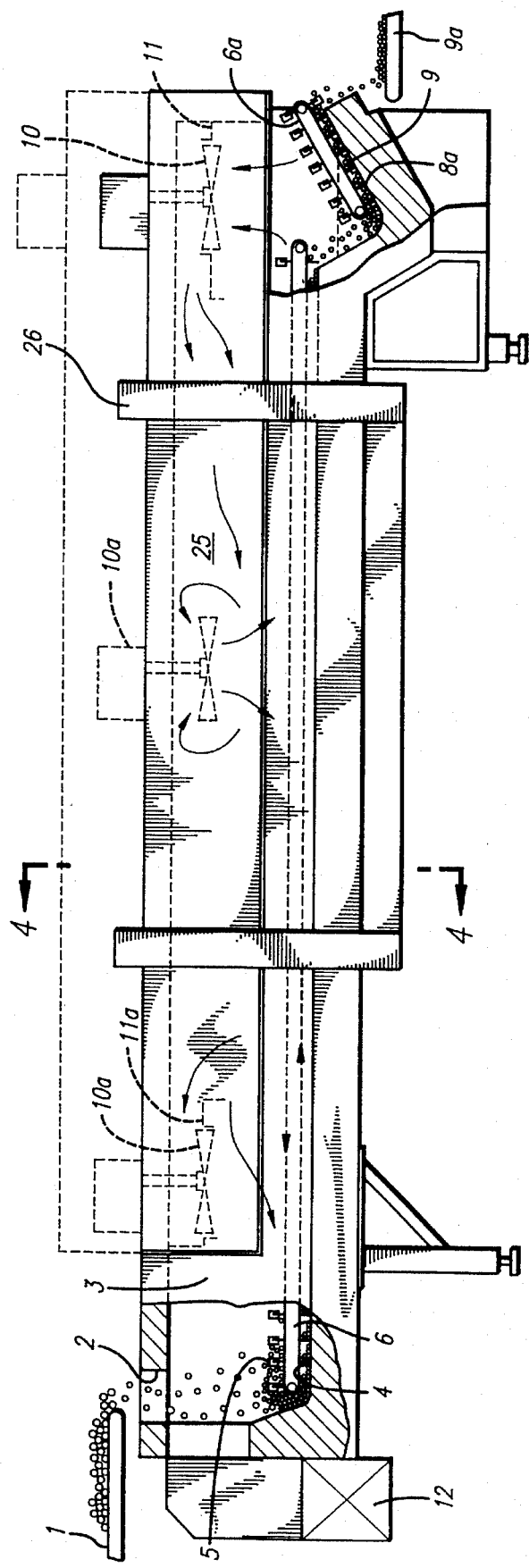

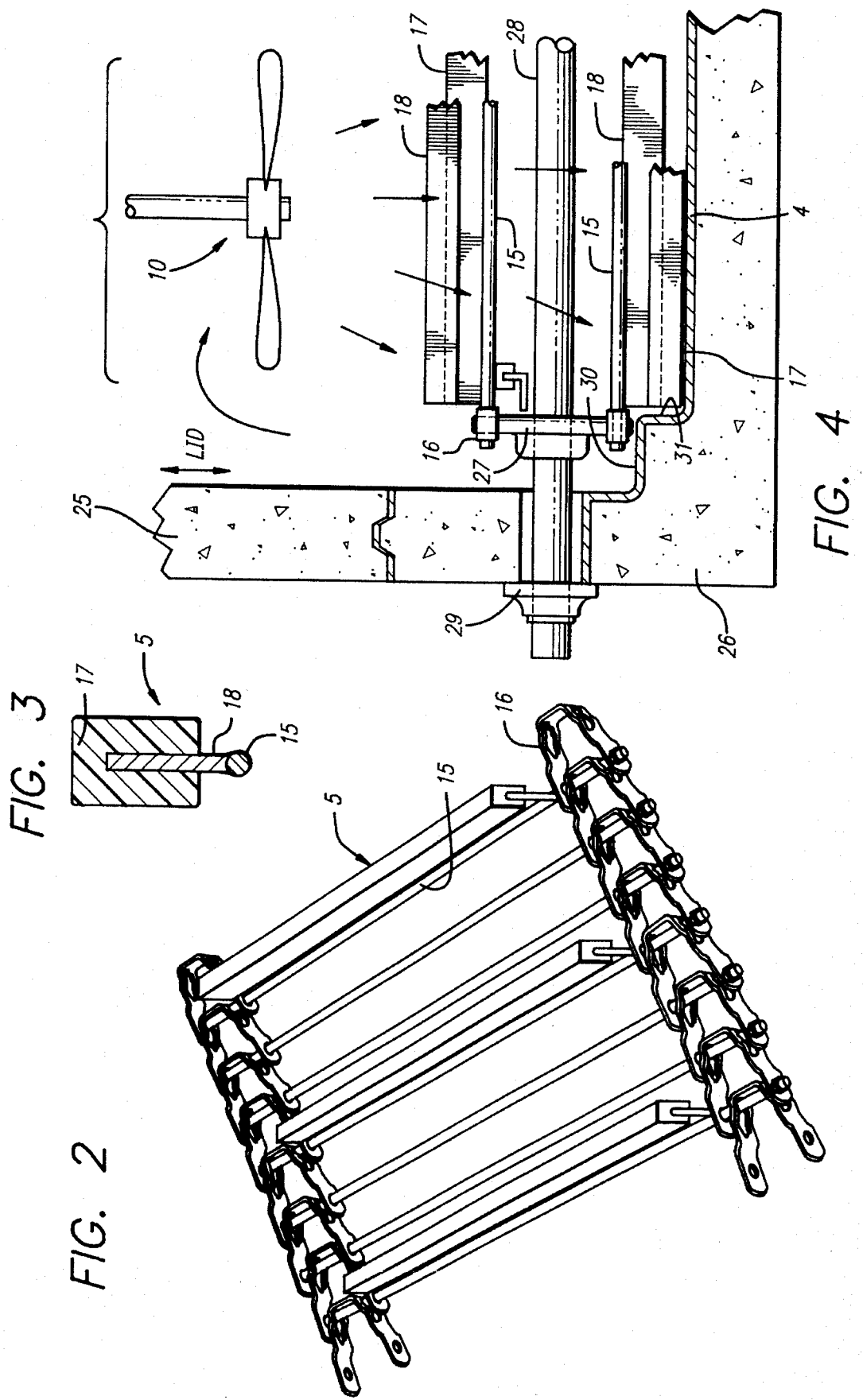

CRYOGENIC FREEZING SYSTEM FOR RUBBER CRUMBS AND OTHER MATERIALS

BACKGROUND OF THE INVENTION

The disposal of used tires for cars and trucks is a very large environmental problem for the U.S.A. and it is even more pronounced for some other densely populated countries all over the world. In the U.S. and Canada alone about 275,000,000 used tires are disposed of annually, usually in an open space. This is added to the estimated 2 to 3 billion tires already stockpiled in the U.S. The impact on the environment is enormous and represents health and fire hazards.

The used tires are composed of about 60% rubber, 40% steel and a small amount of plastic fiber. All these materials are reusable and recycling of used tires represents a very substantial new resource. The steel can be melted down, and the plastic fibers can be used several ways.

The use of rubber, the largest component of used tires, has received the most attention and it is fast expanding.

Rubber crumbs added to asphalt produce better and longer lasting roads. Other products such as floor tiles, rubber mats, tennis balls, trash cans, etc., are also made from crumb rubber. At this time there are several hundred developed applications for used rubber and the list is growing.

The development of rubber recycling technology started about two decades ago. However, the economical and environment-friendly recycling methods have been developed just recently. They can be classified as ambient grinding and cryogenic grinding methods. The final product of both methods is very similar, crumb rubber, by some called granules, ranging in size from 0.5 to 5 mm or ASTM classification 4–30 mesh. The larger sizes, 4 to 15 mesh, represent the most of production volume.

Some used rubber applications require much smaller sizes, 60–120 mesh, and the current price of this product is about $0.45/lb compared to about $0.15/lb for larger size crumb. Such price differences inspired development of methods to reprocess the crumbs to smaller size by secondary cryogenic freezing and grinding. The crumbs must be cooled to below $-100°$ F. to become hard and brittle, so that hammer-mill type equipment can be used to reduce the crumbs to a desired size.

Several methods, such as injecting liquid nitrogen in the mill, have been tried but the cost becomes prohibitive and it is not economically feasible. Several pounds of nitrogen are needed to freeze a pound of crumbs.

SUMMARY OF THE INVENTION

The present invention used for economical freezing of crumbs which can be rubber, plastic or any other material, provides for precooling and immersion freezing of the crumb material.

The presently preferred embodiment of the cryogenic freezing system of the invention includes a cooling tunnel with a tunnel inlet end, a tunnel outlet end, and a floor therebetween, a tank for a liquid cryogenic material, with a tank inlet end, a tank outlet end, and a floor therebetween, a first conveyor for moving crumb material along the tunnel floor from inlet to outlet for depositing crumb material into the tank, and a second conveyor for moving crumb material along the tank floor from the inlet through the outlet, and means for moving cryogenic material vapor from the tank through the tunnel.

The tank floor preferably includes a ramp, with the second conveyor positioned to move the crumb material along the floor of the tank upward along the ramp out of the liquid cryogenic material prior to reaching the tank outlet.

Preferably each of the conveyors includes an endless belt of open material, with the openings of a size to pass the crumb material so that the crumb material will fall through the conveyors onto the respective floors, and a plurality of scraper blades carried on each belt and spaced therealong, with the scraper blades projecting outward from the conveyors to move through the tunnel and tank in contact with the floors.

The scraper blades desirably are of a low friction material so as to continuously engage and drag along the floors, and the conveyors preferably are formed of a plurality of open sections formed by transverse rods with adjacent rods joined by links, and with scraper blades carried on selected ones of the rods.

Other objects, features, advantages and results will more fully appear in the course of the following description.

BRIEF DESCRIPTION OF THE DRAWINGS

FIG. 1 is a side view, partly in section, illustrating the presently preferred embodiment of the cryogenic freezing system of the invention;

FIG. 2 is an enlarged perspective view of a portion of one of the conveyors utilized in the apparatus of FIG. 1;

FIG. 3 is an enlarged sectional view illustrating the construction of the scraper blade and its attachment to a conveyor;

FIG. 4 is an enlarged partial sectional view taken along the line 4—4 of FIG. 1.

DESCRIPTION OF THE PREFERRED EMBODIMENT

Liquid nitrogen (LN2) has a cooling capacity of about 85 BTU/lb heat of vaporization and additional 85 BTU/lb as a latent heat of vapor, thus the total potential cooling using liquid nitrogen is about 170 BTU/lb. Cooling of a pound of rubber crumbs from 75° F. to $-120°$ F. requires about 0.75 lb of LN2. This is sufficient to compensate for all usual system losses. At a realistic 75% to 80% efficiency, cooling a pound of crumbs can be done with less than one pound of LN2.

Referring to FIG. 1 of the drawings, the ambient temperature crumbs are introduced by a feeding conveyor 1 to inlet port 2 at the inlet end of a cooling tunnel 3. Crumbs fall to the floor 4 of the tunnel and are moved along the floor by cleats or scraper blades 5 of an open type conveyor 6. At the discharge or outlet end of the cooling tunnel crumbs are introduced into a LN2 bath 8 in a tank 8a. Another conveyor 6a with blades 5 moves the crumbs along the sloped bottom or ramp 9 of the tank to the outside of the freezing system onto another conveyor 9a.

The crumbs falling into the LN2 bath cause boiling which creates near $-320°$ F. nitrogen vapor. A suction type fan 10 directs the vapor to travel through the tunnel in the opposite direction of crumbs, by means of a shroud 11. Thus a counterflow of vapor in the tunnel precools the crumbs as they move through the tunnel. At the inlet end of the cooling tunnel, the vapor is collected in an exhaust duct 12 and discharged into ambient by an exhaust fan. If desired, one or more additional recirculating fans 10a may be installed in a similar manner as fan 10 along the length of the tunnel to improve the efficiency of cooling of crumbs.

The crumbs enter the cooling system at ambient or lower temperature. Inside the cooling tunnel the temperature is reduced to about 0° F. In the immersion tank the crumb temperature is reduced to about −100° F. or lower as required for the miling process.

The conveyors of the cooling tunnel and the immersion freezer tank preferably are equipped with separate variable adjustable speed gear motors to drive the respective conveyors.

The LN2 level in the immersion freezer tank may be automatically maintained by a conventional adjustable set point device. The final temperature of crumbs is determined by the dwell time in the LN2 bath, which is regulated by the adjustable speed drive motor for the conveyor to provide the most efficient use of LN2.

Open type conveyors with connecting rods 15 joined by links 16 every ¾, 1 or 1 ½" are commercially available. The cleats or blades 5 are formed of wipers 17 carried on pins 18 fixed to selected rods. The wipers typically are made of a special low temperature plastic having a very low friction against the floor to move crumbs efficiently with a minimum of wear of the components.

The moving of the blades along the floor pushes the crumb material and makes handling of difficult products such as crumbs simple, effective and fully controllable with practically no waste. The conveyor belt by its weight makes the engagement between the scraper blades and the floor. The conveyor belt is free to move up to ride over excessive material without jamming the system.

The system can be built for practically any capacity by simplying using a wider conveyor belt, and a single section conveyor is shown in FIG. 3. For larger capacity freezing systems wider belts and/or two or more belts in parallel may be used.

Desirably the tunnel 3 has a cover 25 with an external lifting frame 26 to provide access to the interior of the tunnel for cleaning and maintenance.

In the presently preferred configuration as best seen in FIG. 4, the belt 5 runs over sprockets 27 carried on a drive shaft 28 mounted in bearings 29, with one end of the shaft connected to the drive motor (not shown). The floor 4 preferably has shoulders 30 at each side wall 31 to provide clearance for the links 16 of the belt, permitting the wipers 17 to extend across the floor from wall-to-wall.

I claim:

1. In a cryogenic freezing system, the combination of:
   a cooling tunnel having a tunnel inlet end, a tunnel outlet end, and a floor therebetween,
   said tunnel inlet end including an access opening for crumb material deposited in said tunnel;
   a tank for a liquid cryogenic material and having a tank inlet end, a tank outlet end, and a floor therebetween;
   a first conveyor for moving crumb material along said tunnel floor from said tunnel inlet end to said tunnel outlet end for depositing crumb material into said tank, with said first conveyor positioned above said tunnel floor so that the crumb material rests directly on said tunnel floor;
   a second conveyor for moving crumb material along said tank floor from said tank inlet end to said tank outlet end, with said second conveyor positioned above said tank floor so that the crumb material rests directly on said tank floor; and
   means for moving cryogenic material vapor from said tank through said tunnel from said tank outlet end toward said tank inlet end.

2. A system as defined in claim 1 wherein said means for moving cryogenic material vapor includes a fan positioned at said outlet end of said tunnel.

3. A system as defined in claim 1 wherein said tank floor includes a ramp, with said second conveyor positioned to move the crumb material along said floor of the tank upward along said ramp out of the liquid cryogenic material prior to reaching said tank outlet end.

4. A system as defined in claim 1 wherein said first conveyor includes an endless belt of open material, with the openings in said open material of a size to pass the crumb material so that the crumb material will fall through said conveyor onto said tunnel floor, and
   a plurality of scraper blades carried on said belt and spaced along said belt.

5. A system as defined in claim 4 wherein said scraper blades project outward from said first conveyor to move through said tunnel from said tunnel inlet end to said tunnel outlet end in contact with said floor.

6. A system as defined in claim 5 wherein said conveyor belt is of a weight to cause said scraper blades to substantially continuously engage and drag along said tunnel floor.

7. A system as defined in claim 4 wherein said conveyor is formed of a plurality of open sections formed by transverse rods with adjacent rods joined by links, and with said scraper blades carried on selected ones of said rods.

8. A system as defined in claim 1 wherein said second conveyor includes an endless belt of open material, with the openings in said open material of a size to pass the crumb material so that the crumb material will fall through said conveyor onto said tank floor, and
   a plurality of scraper blades carried on said belt and spaced along said belt.

9. A system as defined in claim 1 wherein each of said conveyors includes an endless belt of open material, with the openings in said open material of a size to pass the crumb material so that the crumb material will fall through said conveyors onto said respective floors, and
   a plurality of scraper blades carried on each of said belts and spaced therealong.

10. In a cryogenic freezing system, the combination of:
    a cooling tunnel having a tunnel inlet end, a tunnel outlet end, and a floor therebetween,
    said tunnel inlet end including an access opening for crumb material deposited in said tunnel;
    a tank for a liquid cryogenic material and having a tank inlet end, a tank outlet end, and a floor therebetween;
    a first conveyor for moving crumb material along said tunnel floor from said tunnel inlet end to said tunnel outlet end for depositing crumb material into said tank;
    a second conveyor for moving crumb material along said tank floor from said tank inlet end to said tank outlet end; and
    means for moving cryogenic material vapor from said tank through said tunnel from said tank outlet end toward said tank inlet end;
    said tank floor including a ramp, with said second conveyor positioned to move the crumb material along said floor of the tank upward along said ramp out of the liquid cryogenic material prior to reaching said tank outlet end;
    each of said conveyors including an endless belt of open material, with the openings in said open material of a size to pass the crumb material so that the crumb material will fall through said conveyors onto said respective floors, and a plurality of scraper blades carried on each of said belts and spaced therealong, with said scraper blades projecting outward from said conveyors to move through said tunnel from said tunnel inlet end to said tunnel outlet end and through said tank from said tank inlet end to said tank outlet end in contact with said floors and with said conveyor belt of a weight to cause said scraper blades to substantially continuously engage and drag along said floors;

with each of said conveyors formed of a plurality of open sections formed by transverse rods with adjacent rods joined by links, and with said scraper blades carried on selected ones of said rods.

11. In a cryogenic freezing system, the combination of:

a cooling tunnel having a tunnel inlet end, a tunnel outlet end, and a floor therebetween, said tunnel inlet end including an access opening for crumb material deposited in said tunnel;

a tank for a liquid cryogenic material and having a tank inlet end, a tank outlet end, and a floor therebetween;

a first conveyor for moving crumb material along said tunnel floor from said tunnel inlet end to said tunnel outlet end; and means for moving cryogenic material vapor from said tank through said tunnel from said tank outlet end toward said tank inlet end;

said first conveyor including an endless belt of open material, with the openings in said open material of a size to pass the crumb material so that the crumb material will fall through said conveyor onto said tunnel floor, and a plurality of scraper blades carried on said belt and spaced along said belt.

12. In a cryogenic freezing system, the combination of:

a cooling tunnel having a tunnel inlet end, a tunnel outlet end, and a floor therebetween, said tunnel inlet end including an access opening for crumb material deposited in said tunnel;

a tank for a liquid cryogenic material and having a tank inlet end, a tank outlet end, and a floor therebetween;

a first conveyor for moving crumb material along said tunnel floor from said tunnel inlet end to said tunnel outlet end;

a second conveyor for moving crumb material along said tank floor from said tank inlet end to said tank outlet end; and means for moving cryogenic material vapor from said tank through said tunnel from said tank outlet end toward said tank inlet end;

with said second conveyor including an endless belt of open material, with the openings in said open material of a size to pass the crumb material so that the crumb material will fall through said second conveyor onto said tank floor, and a plurality of scraper blades carried on said belt and spaced along said belt.

13. A system as defined in claim 12 wherein said first conveyor includes an endless belt of open material, with the openings in said open material of a size to pass the crumb material so that the crumb material will fall through said first conveyor onto said tunnel floor, and a plurality of scraper blades carried on said belt and spaced therealong.

* * * * *